United States Patent
Grill (10) Patent No.: US 6,230,587 B1
(45) Date of Patent: May 15, 2001

(54) CORRUGATED GEAR AND PROCESS FOR CALCULATING GEAR PROFILES FOR CORRUGATED GEARS

(75) Inventor: Joachim Grill, Bondorf (DE)

(73) Assignee: IMS Morat Soehne GmbH (DE)

( * ) Notice: Subject to any disclaimer, the term of this patent is extended or adjusted under 35 U.S.C. 154(b) by 0 days.

(21) Appl. No.: 09/369,705

(22) Filed: Aug. 6, 1999

(30) Foreign Application Priority Data

Aug. 6, 1998 (DE) .............................. 198 35 571

(51) Int. Cl.$^7$ .................................. F16H 49/00
(52) U.S. Cl. .................................. 74/640
(58) Field of Search .................................. 74/640

(56) References Cited

U.S. PATENT DOCUMENTS

| | | | |
|---|---|---|---|
| 4,663,813 | * 5/1987 | Carlson | 74/640 X |
| 4,667,539 | * 5/1987 | Fickelscher | 74/640 |
| 4,770,059 | * 9/1988 | Beyer | 74/640 |
| 4,850,237 | * 7/1989 | Hatayama et al. | 74/640 |
| 4,874,067 | * 10/1989 | Greenwell | 74/640 X |
| 4,969,376 | * 11/1990 | Fickelscher | 74/640 X |

FOREIGN PATENT DOCUMENTS

| | | | |
|---|---|---|---|
| 463227 | * 11/1968 | (CH) | . |
| 3784839 | * 11/1988 | (DE) | . |
| 3876566 | * 3/1989 | (DE) | . |
| 69212703 | * 11/1992 | (DE) | . |
| 69406515 | * 1/1995 | (DE) | . |

OTHER PUBLICATIONS

Motyka, St.; "Verkürzte Bauform des Harmonic Drive", of: DE–Z, Konstruktion 45 (1993), S. 221–226.*

* cited by examiner

*Primary Examiner*—Sherry Estremsky
(74) *Attorney, Agent, or Firm*—Pendorf & Cutliff (57) ABSTRACT

A corrugated gear includes a rigid internally geared gear; a flexible externally geared gear within the internally geared gear; a wave generator to bring the gear with the external teeth into a cross-sectional shape in such a way that the gear with the external teeth is only meshing partially with the rigid internally geared gear and the engagement segment of the two gears rotates in the direction of the circumference; by the rotation of the wave generator a relative movement of the two gears can be produced; the flexible gear and the rigid gears are both rim gears; and in order to avoid engagement obstructions, the tooth profile of the rigid gear and the tooth profile of the flexible gear are coordinated or matched. The gear is characterized in that the tooth profile of the flexible gear and the tooth profile of the rigid gear are chosen in such a way that every tooth of the flexible gear can make a loop-shaped movement within a tooth gap of the tooth profile of the rigid internally geared gear, whereby the movement contour of a tooth of the flexible gear while making its loop-shaped movement determines at least approximately the contour of a tooth gap of the tooth profile of the rigid gear.

19 Claims, 10 Drawing Sheets

FIG 1  Guide Curve

Guide Curve under Load ≠ Ellipse

Guide Curve under Load

FIG 6  Description of the Tooth Movement without supplemental rotation with supplemental rotation

FIG 2

Engagement Discontinuities

Loadfree

Engagement Discontinuities
Resulting from Deformations of
the Internal Gear without load under load

Engagement Discontinuities
Resulting from Stretching of
the Internal Gear

FIG 3

Calculating only tooth head

φ  Drive angle of rotation

Entire Tooth

Pole Curve outside the Tooth
→ poor effectiveness

Pole Curve within the Tooth
→ good effectiveness

——————————  Polar curve

Tooth

Guide Curve via FEM or BEM

FIG 9

The Coordinate Systems

Deformation Model a) Chain Model b) Bernoulli Model

Guide Curve

Non-deformed

Tooth

Deformed

Polar Curves

Bad Effectiveness

FIG 15

Polar Curves

Improved Effectiveness (Polar curves in the vicinity of the teeth)

FIG 16

CORRUGATED GEAR AND PROCESS FOR CALCULATING GEAR PROFILES FOR CORRUGATED GEARS

BACKGROUND OF THE INVENTION

1. Field of the Invention

The invention concerns a corrugated gear, and particularly a corrugated gear wherein the tooth profile of the flexible gear and the tooth profile of the rigid gear are chosen in such a way that every tooth of the flexible gear can make a loop-shaped movement within a tooth gap of the tooth profile of the rigid internally geared gear, wherein that the movement contour of a tooth of the flexible gear while making its loop-shaped movement determines at least approximately the contour of a tooth gap of the tooth profile of the rigid gear.

2. Description of the Related Art

All corrugated gears include a deformable internal gear. This could be made of metal or could also be made of plastic. A guide curve is used to describe the shape of the deformed internal gear (for example, an ellipse in harmonic drives) (see FIG. 1). If the deformations under load are not considered, or in the case of a too general model, engagement discontinuities or disruptions occur, which have a negative impact on effectiveness and life expectancy (see FIG. 2).

The deformations can occur in a radial direction, for example among the individual rollers or studs or planet arms, or the deformations can occur in the direction tangential to the internal gear, when the internal gear is stretched or stressed in the longitudinal direction during the transmission of torque. When these deformations are not taken into consideration this leads to disruptions in gear tooth engagement, to an increase in tooth flank wear, and, as a result of the deformation of the tooth head in the radial direction, to damage of the gear tooth head and a reduction in gear tooth efficiency. The tooth efficiency has a very large influence on the efficiency particularly in high reduction planetary gears and also in corrugated gears.

SUMMARY OF THE INVENTION

The invention comprises a corrugated gear including the features of:

a) a rigid internally geared gear;

b) a flexible externally geared gear within the internally geared gear;

c) a wave generator to bring the gear with external teeth into a cross-sectional shape in such a way, that the gear with external teeth is only meshing partially with the rigid internally geared gear and the engagement segment of the two gears rotates in the direction of the circumference;

d) by the rotation of the wave generator a relative movement of the two gears can be produced;

e) the flexible gear and the rigid gear are both rim gears;

f) in order to avoid engagement obstructions the tooth profile of the rigid gear and the tooth profile of the flexible gear are coordinated or matched.

According to the invention the gear is characterized thereby, that g) the tooth profile of the flexible gear and the tooth profile of the rigid gear are chosen in such a way that every tooth of the flexible gear can make a loop-shaped movement within a tooth gap of the tooth profile of the rigid internally geared gear, and h) the movement contour of a tooth of the flexible gear while making its loop-shaped movement determines at least approximately the contour of a tooth gap of the tooth profile of the rigid gear.

BRIEF DESCRIPTION OF THE DRAWINGS

For a fuller understanding of the nature and objects of the present invention reference should be made by the following detailed description taken in with the accompanying drawings in which:

FIGS. 4 and 5 show that in the case of the roller bushing the optimization of the hub of the wave generator is significantly improved through the shape of the wave generator, and that by the selection of the tooth count the position of the axoid or as the case may be the polar curve is significantly improved.

FIG. 9 shows that for the mathematical description of the movement and the tooth flanks the coordinate system is introduced for the individual components.

The two non-slip paths must be referenced to the same parameter, wherein for example the time t can be selected. For each guide curve the relationship $s(\phi)$ must be determined with FIG. 10 shows how the relationship $s(\phi)$ must be determined for each guide curve.

DETAILED DESCRIPTION OF THE INVENTION

Figure 3:
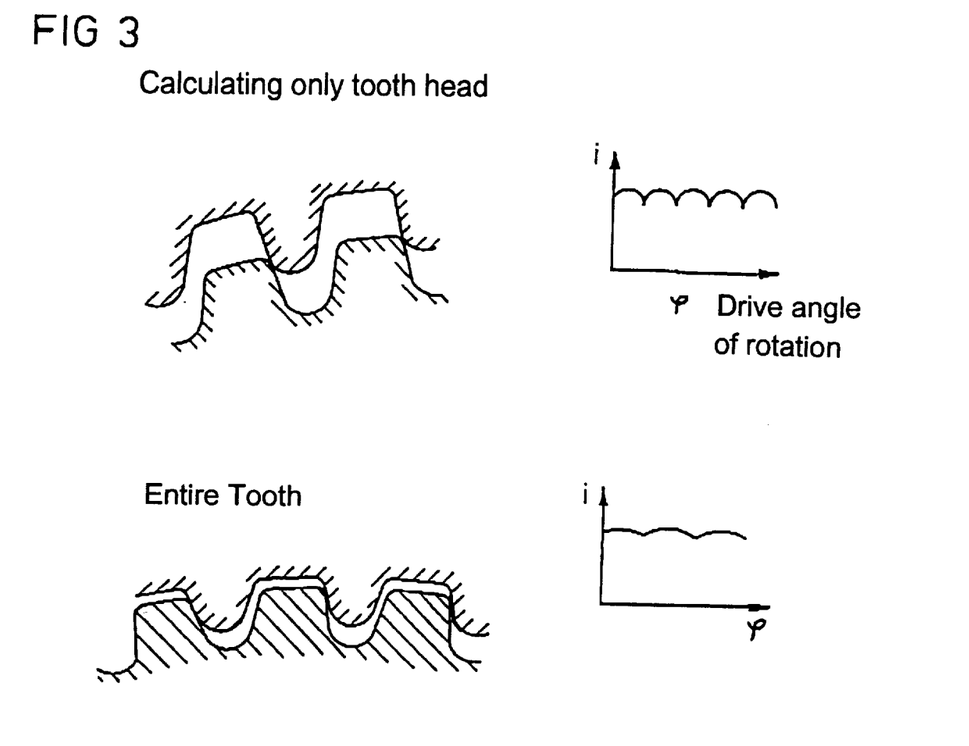
FIG. 3 shows that as a result of an optimal tooth foot shape there is additionally an optimization of the tooth foot strength and the meshing surface, whereby an increased power density of the gear is achieved.

A substantial benefit or advantage of this new connection or arrangement is that the tooth profile and all tooth flanks (foot, active flank and head flank) are calculated with their opposing flanks. In the case, as in HD (harmonic drive) patents, that only the shape of the tooth in double engagement is considered, that is, the head of the tooth is optimized, then on the active flank a non-constant transmission process and therewith a deviation in angle of rotation occurs. If the flanks are determined on the basis of the spatial gear principle, then these errors are minimized. As a result of an optimal tooth foot shape there is additionally an optimization of the tooth foot strength and the meshing surface, whereby an increased power density of the gear is achieved (FIG. 3).

Further advantages include that as a result of a spatial set-up a built-in tilting of the drive- and driven-shafts under load can be simulated. Further, with this set-up, not only the coordinates of the opposing flanks are calculated but also the first derivative, that is, the normal and the curvature of the spatial tooth flanks and the main curvature direction. The detection or recognition of the normal occurs under other preconditions for the measuring of the flanks on a 3D measuring machine, since the sensor must engage perpendicular to the tooth flank. The determination of the main curvature direction and the curves is necessary for the strength calculations of the flanks. The follow-up calculations necessary for the design of the gears with respect to the flank load bearing capacity the flank pressures which occur must be calculated with the aid of the Hertz theory. The conventional formulas or equations according to DIN3990 or similar calculation equations are valid only for involute gears and cannot be employed for the present gears which are non-involute.

Figure 4:
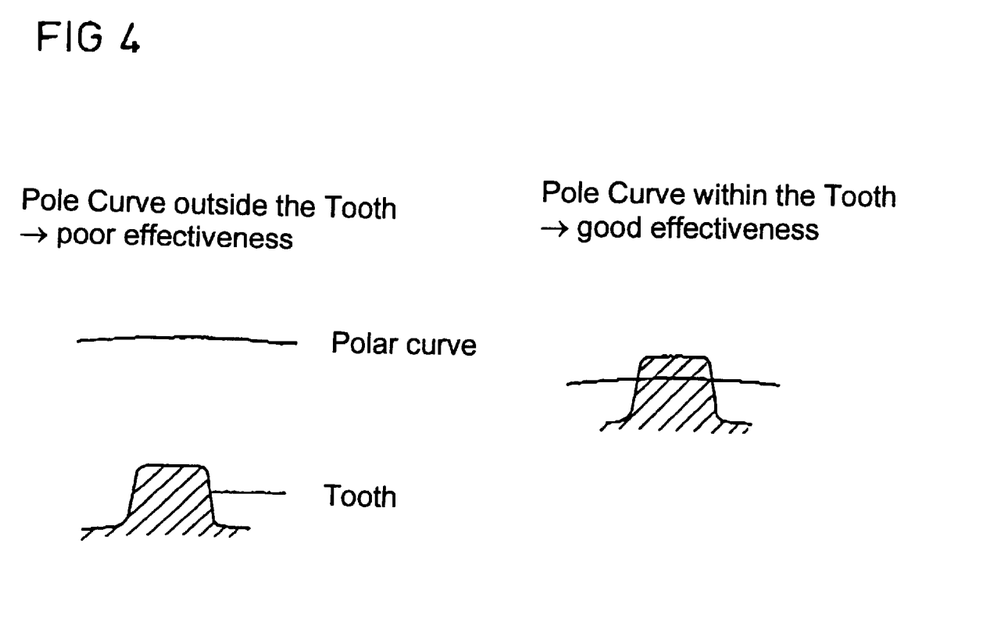
Figure 5:
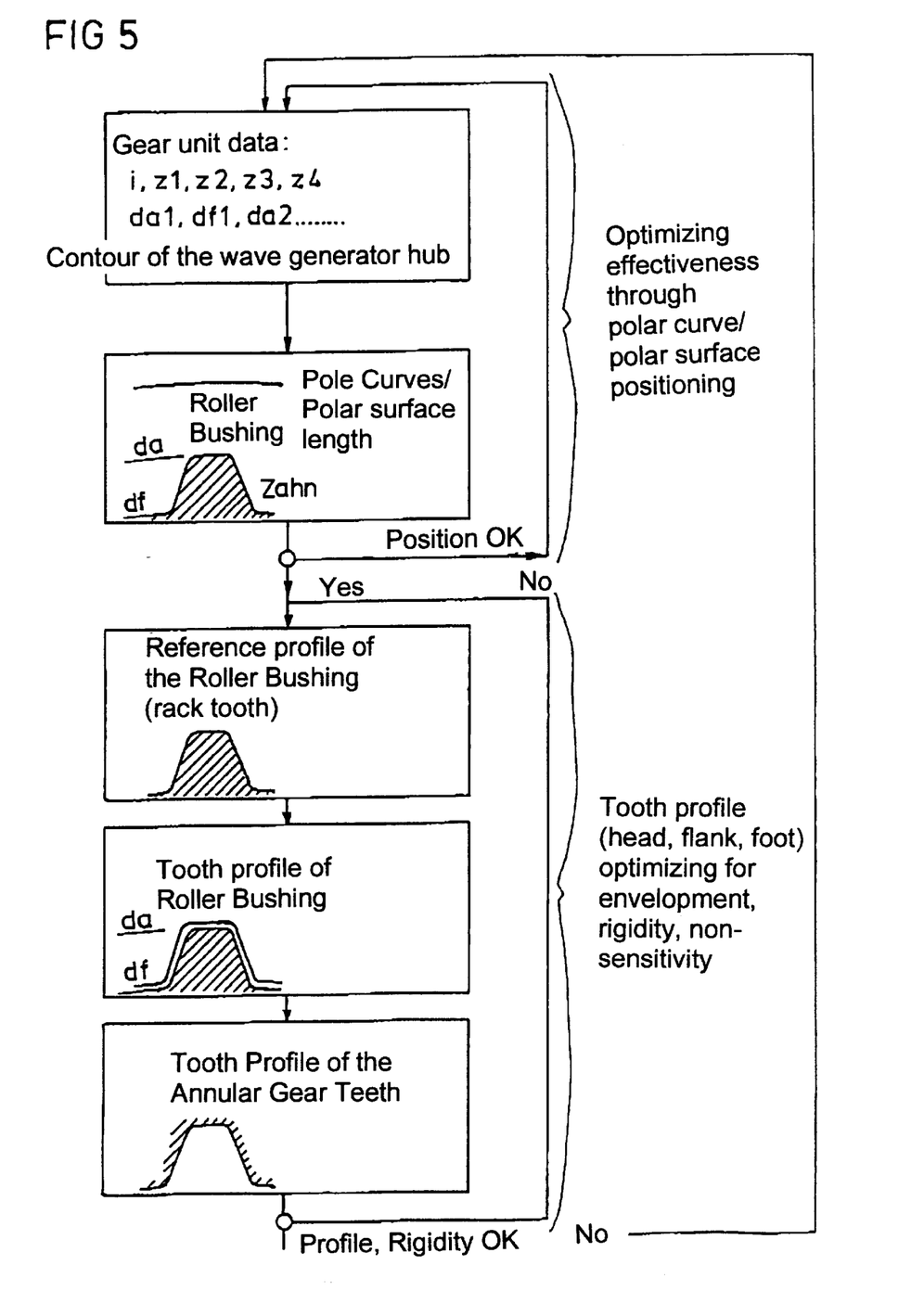
FIG. 5 more specifically shows a method for improvement of the effectiveness and the service life as well as for the optimal arrangement of the gear pairs both with and without load.

A further advantage of this mating or engagement is the calculation of the polar curves in a planar description and the spatial or three-dimensional axoids which according Reuleaux produce the movement by a parting-off or chiseling off. The polar curves and the axoids are calculated from the angular velocity and the velocity of the screw motion, that is, from the speed. If one does not know the speed and the acceleration, then the gears cannot be optimized with respect to their efficiency or effectiveness. In the case of the roller bushing the optimization of the hub of the wave generator is significantly improved through the shape of the wave generator, and through the selection of the tooth count the position of the axoid or as the case may be the polar curve is significantly improved (FIG. 4 and FIG. 5).

In the case of an optimization with the aid of a computer program the gearing is quickly optimized iteratively on the computer screen by the displacement or relocation of the polar curves or, as the case may be, axoids.

This advantage is readily apparent, when one considers the case of a gearing with the same tooth count between the roller bushing and drive gear, as it is described for example in the patents (HD) for the flat variant. It is immediately obvious, that in the case of a ratio 1:1 the polar curves lie wide outside of the gears (FIG. 4), that is, a very high amount of sliding occurs. By an optimization of the measurements, the polar curve is brought directly into the area of the gears. The gear effectiveness is therewith improved by approximately 1%. Depending upon the gear reduction relationship this has serious consequences upon the overall effectiveness of the gear. This can, in the case of a reduction of >200, with an improvement of 1% in the tooth effectiveness, result in more than a doubling of the total effectiveness.

Figure 6:
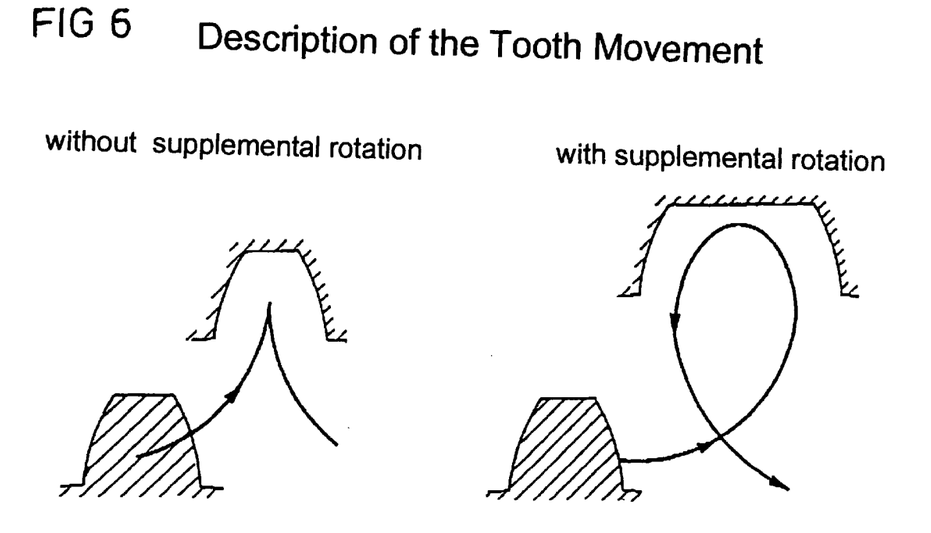
FIG. 6 shows that that the differences in supplemental movement occurring between the wave generator and the roller bushing as a result of the different tooth counts is are clearly apparent in the case of a 1:1 drive in the flat variant. If this supplemental movement is not taken into consideration, then the tooth gap in the internally geared gear is too small, and if this supplemental movement is taken into consideration, then one obtains the movement of the roller teeth in the internally geared gear gap.

A further advantage of this new method is that the supplemental movement occurring between the wave generator and the roller bushing as a result of the different tooth counts is taken into consideration. The differences are clearly apparent in the case of a 1:1 drive in the flat variant (FIG. 6). If this supplemental movement is not taken into consideration, then the tooth gap in the internally geared gear is too small. In contrast, if this supplemental movement is taken into consideration, then one obtains the movement of the roller teeth in the internally geared gear gap. It is virtually apparent from the figures that the tooth gap must be substantially larger.

For improvement of the effectiveness and the service life as well as for the optimal arrangement of the gear pairs both with and without load the following method is set forth (FIG. 5).

Figure 7:
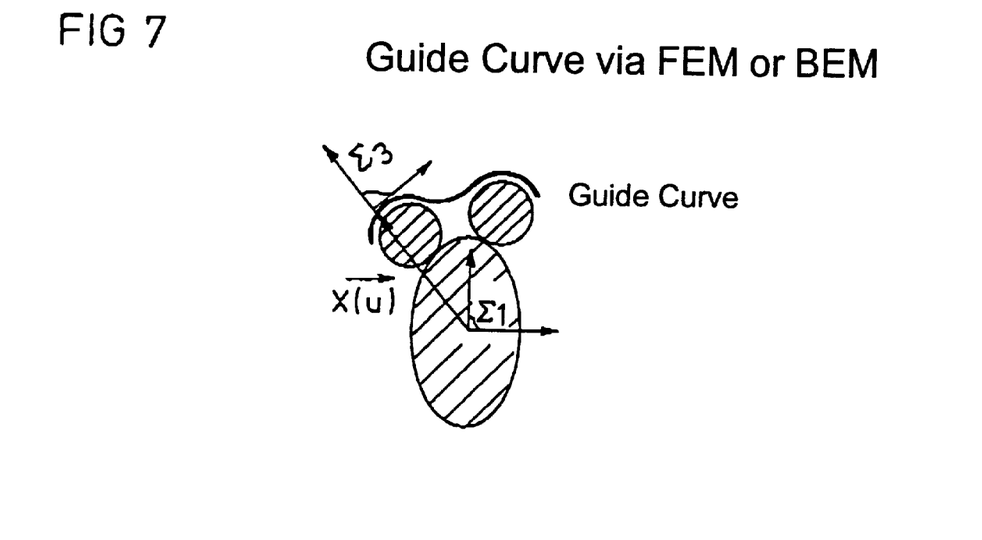
FIG. 7 shows that the guidance curve can vary, and the precise contour under load can be determined for example with the aid of the FEM or BEM methods.

The guidance curve can vary, the precise contour under load can be determined for example with the aid of the FEM or BEM methods (FIG. 7).

In the case that the roller bushing is made of a softer material (for example plastic) and the housing and the driver of a rigid material (for example sintered steel, metal) then the teeth of the roller bushing can be provided with a larger tooth thickness than those of the housing.

Figure 8:
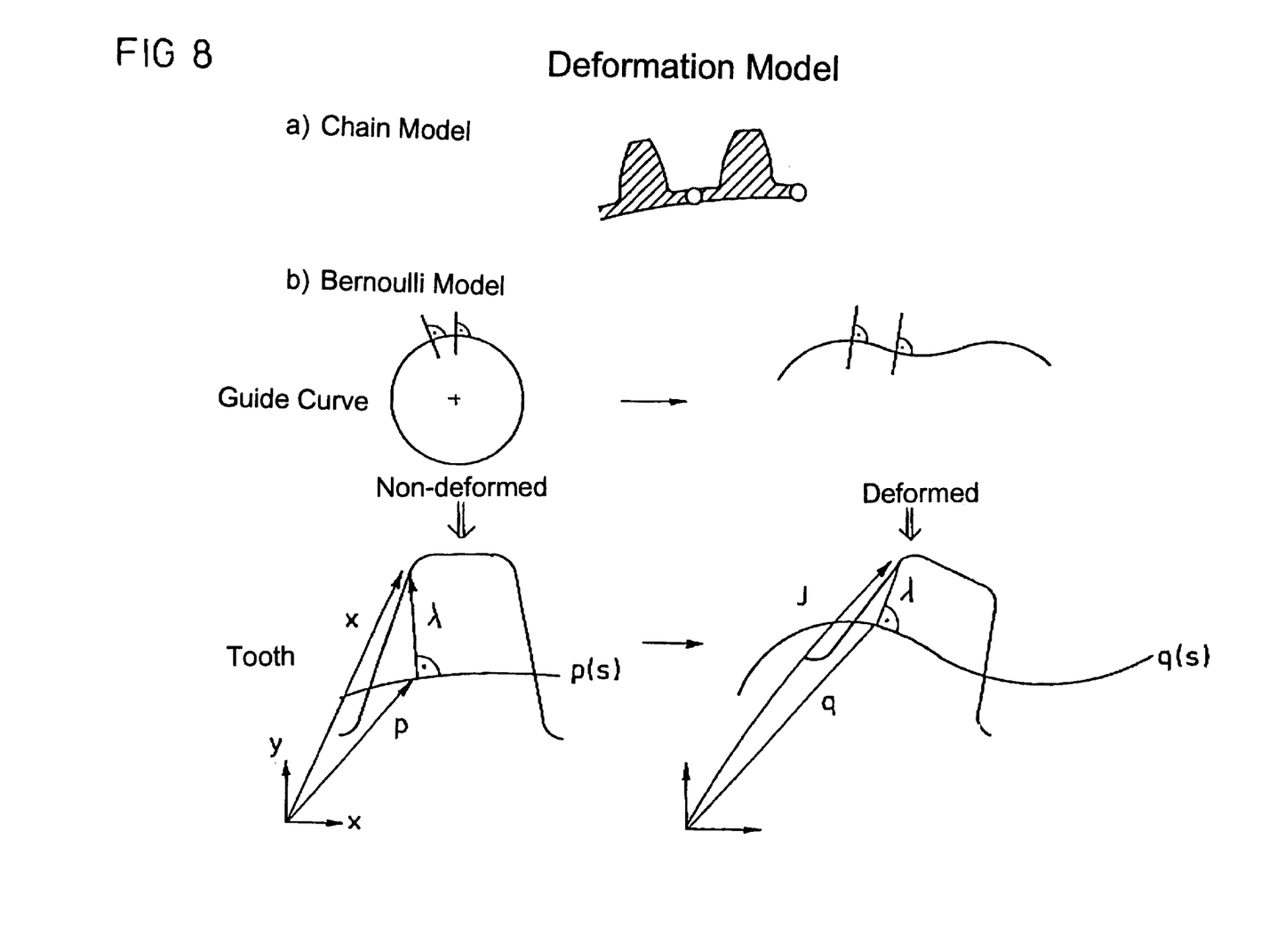
FIG. 8 shows that during the deformation of the roller bushing the teeth essentially retain their shape—deformation model a—and in the case that the roller bushing, housing and driver are constructed of a material with similar strength or in the case of an appropriate tooth count the thickness of the teeth and the tooth gap in the roller bushing is essentially identical in size one calculates with improved deformation model b employing the theory of the strongly curved beam in combination with the Bernoulli hypotheses.

During the deformation of the roller bushing the teeth essentially retain their shape (FIG. 8, deformation model a). In the case that the roller bushing, housing and driver are constructed of a material with similar strength (for example POM and PA) or in the case of an appropriate tooth count the thickness of the teeth and the tooth gap in the roller bushing is essentially identical in size.

In this case one calculates with an improved deformation model (FIG. 8, deformation model b). Herein the theory of the strongly curved beam is employed in combination with the Bernoulli hypotheses.

In the case that the tooth in the representation x(u) and the non-deformed circular roller bushing is present in the form p(s), the Bernoulli hypotheses then implies the following arrangement or association:

$\vec{p}(s)+\lambda \vec{n}(s)=\vec{x}(u)$  $\vec{n}(s)$=normal vector of the non-deformed annular gear $\Rightarrow F(u,s)=(\vec{p}(s)-\vec{x}(u))*\vec{t}(s)$  $\vec{t}(s)$=tangential vector of the non-deformed annular gear $$\Rightarrow s(u)$$

$$\Rightarrow \lambda(s(u)) = \frac{(\vec{x}(u) - \vec{p}(s))*\vec{n}(s)}{\vec{n}^2(s)}$$

Figures 9, 10:
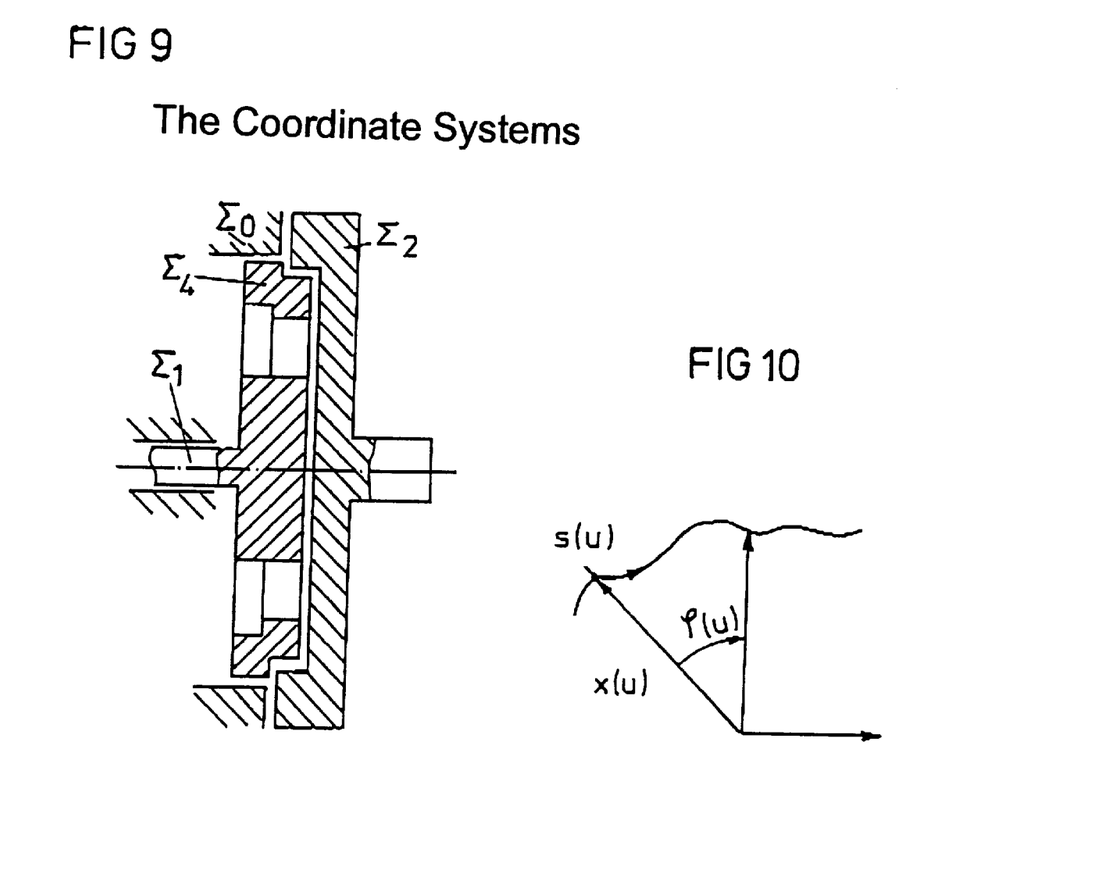

The deformed annular gear can be calculated in the following manner:

$\vec{q}(s)$=neutral phase of the deformed annular gear $\vec{y}(u)=\vec{q}(s(u))+\lambda(s(u))\vec{n}(s)$=normal vector of the neutral phase, $\vec{y}$=deformed tooth contour For the mathematical description of the movement and the tooth flanks the coordinate system is introduced for the individual components (FIG. 9).

Σ0: annular or internally geared gear=engagement system
Σ1: drive or power in system
Σ2: driven system
Σ3: accompanying bipod of the guide curve
Σ4: roller bushing system For the description of the remaining movement flow or path the tooth count is required:
z1: roller bushing on internally geared gear side
z2: internally geared gear
z3: roller bushing on driven side
z4: driven or output system The teeth of the roller bushing are described in the system Σ4, the teeth of the internally geared gear in system Σ0 and in the case that a gear is provided in the driven side, the teeth of the driven side are described in system Σ2.

The guide curve is described by x(s) wherein the o.B.d.A. is the base restarting condition. The constrained or compelled Σ3/Σ1 has the following coordinate transformations (described homogenous coordinates)

$\vec{x}(s)$ guide curve $$T_{31} = \begin{bmatrix} T & \vec{t} \\ O & 1 \end{bmatrix}$$ coordinate transformation in a homogeneous or uniform system $T=(\vec{t}, \vec{n}, \vec{b})$  $\vec{t}$ =tangential vector, $\vec{n}$ =normal vector, $\vec{b}$ =binormal vector $\vec{x}_s = \vec{t}$, κ=curvature of the guide curve, τ=torsion of the guide curve $b=(\vec{\omega}, \vec{v})=(\tau \vec{t} + \kappa \vec{b}, \vec{t})$ b=wrench or screw motion defined by angular velocity $\overline{\omega}$ and velocity v $b_s=(\tau_s \vec{t} + \kappa_s \vec{b}, \kappa \vec{n})b_s$=the first derivative of the screw motion defined by angular velocity $\overline{\omega}$ and velocity v $\vec{x}^1 - T_{21}x^3$ With the above transformation instructions the movement of the annular gear relative to the drive system is described. With the help of the screw motion defined by angular velocity ω and velocity v, and the first derivative of the screw motion defined by angular velocity $\overline{\omega}$ and velocity v, the speeds and accelerations are calculated. The various contours of the guide curve can be described by the general application with help of the FRENETic derivative equations and the methods of the kinematic differential geometry.

As a result of the different tooth counts between the roller bushing and the internally geared gear or as the case may be the driver there results the following constrained or non-slip motion:

Σ1/Σ2: rotation about the z-axis with the transmission relationship $$i_{12} = \frac{z1 * z4}{z1 * z4 - z2 * z3}$$

Σ4/Σ3: rotation about the z-axis with the transmission relationship $$i_{43} = \frac{z1}{z1 - z2}$$

Σ1/Σ0: rotation about the z-axis with the drive angular acceleration $\overline{\omega}_{10}$ So that the correct engagement occurs, the teeth on the side of the internally geared gear must be an enveloping surface pair of the non-slip path Σ4/Σ0 and the teeth on the driven side must be an enveloping surface pair of the non-slip path Σ4/Σ1.

The non-slip paths can be determined by sequentially carrying out:
Σ4/Σ0=Σ4/Σ3+Σ3/Σ1+Σ1/Σ0
Σ4/Σ2=Σ4/Σ0+Σ0/Σ1+Σ1/Σ2

In the consecutive carrying out of non-slip runs or paths the corresponding screw motions defined by angular velocity $\overline{\omega}$ and velocity v are added and transformed into the respective system.

A special feature or peculiarity lies in the description of the teeth in a roller bushing system. Thereby they can be described as above the most various tooth counts in the engagement's roller bushing/internally geared gear and roller bushing/drive (these supplemental movements are not considered in the patents).

The description of the non-slip movement of the roller bushing deformed under load can occur only with the aid of a computer program, which carries out the sequential executions and at the conclusion for each point in time from the translations and the deformations calculates the guide curve of the coordinate transformation, the speeds, accelerations and the polar curves and axoid.

For the calculation of the gear pairing there is preferably a first gear predetermined and the above described non-slip path calculated for the second with the aid of the spatial gearing principle. From the speed and acceleration and the spatial gear principle the coordinates, the first derivative, the normal vector and the curvature with the second fundamental shape of the gear teeth is determined.

In the description of the non-slip path Σ3/Σ1 there is employed as parameter the curvature length s of the guide curve while the driven angle is calculated from:

$\phi_{an} + \overline{\omega}_{an} * t$=drive angle speed

The two non-slip paths must be referenced to the same parameter, wherein for example the time t can be selected. For each guide curve the relationship s(φ) must be determined with FIG. 10.

In the case of complex guide curves as they occur under load, this can also be accomplished by calculation of support points and approximation of the function s(φ). During the reparameterizing the derivatives are then determined with the fundamental axiom via implicit functions and the screw motions defined by angular velocity $\overline{\omega}$ and velocity v with the aid of the chain rule.

b(s(φ))+b(s)*ds/dφ.

For achievement of the invention reference is made to the following FIGS. 11 through 16.

Figure 11:
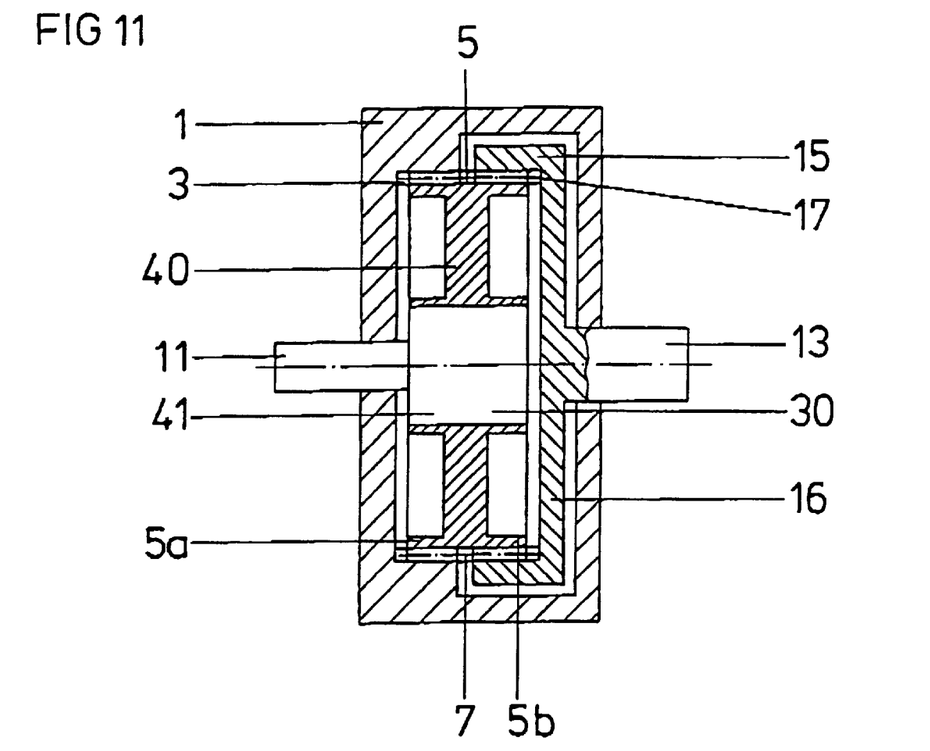
FIG. 11 schematically represents a sectional view through an illustrative embodiment of a reduction gear according to the invention.

In FIG. 11 there is schematically represented a sectional view through an illustrative embodiment of a reduction gear according to the invention. The associated FIG. 12 shows the associated gear functional block diagram.

The reduction gear is comprised of a fixed support ring 1, which in the present embodiment shown in FIG. 11 is formed as a housing. The rigid support ring 1 includes a cylindrical, internally geared support surface 3 with a first tooth count Z1. Within the support ring 1 there is a radially flexible roller bushing 5 with an outer geared surface 7. One or more first circumference sections of the outer surface 7 of the roller bushing 5 are in meshing engagement with the support surface 3 of the support ring 1. The roller bushing 5 however exhibits a wider breadth than the breadth of the support surface 3. The drive or power input and the deformation of the roller bushing 5 occurs in the manner of the known harmonic drive gears as discussed in the background section, and accordingly reference is expressly made to the documents mentioned in the introductory portion for detailed disclosure. The drive means 30 which are described in greater detail in connection with the following figures are fixedly connected with the drive shaft 11.

Figure 12:
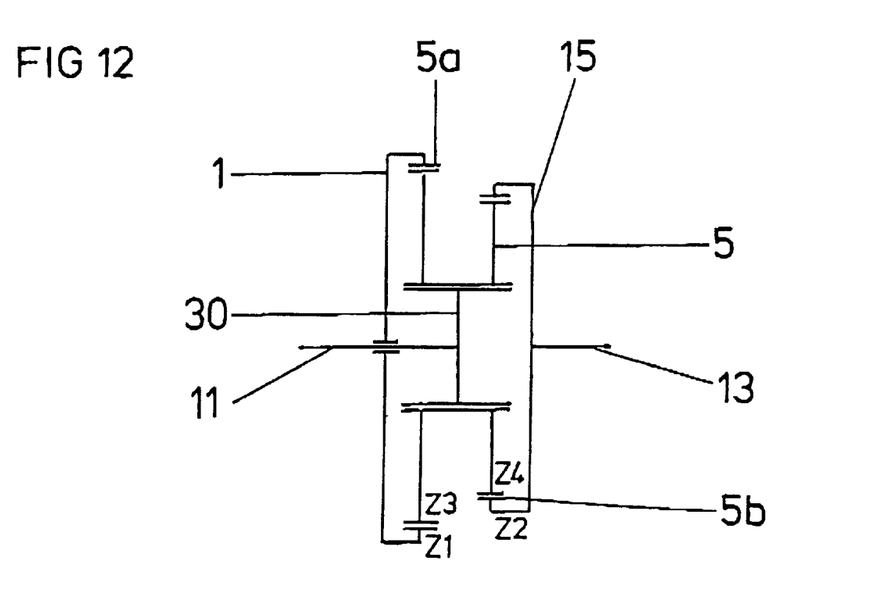
FIG. 12 corresponds with FIG. 11 and shows the associated gear functional block diagram.

The drive side of the reduction gear shown in FIGS. 11 and 12 is achieved by a drive internally geared gear 15, which exhibits a cylindrical, internally geared ring surface 7 with a second tooth count Z2, which according to the amount of rotation input by the drive means 30 is likewise in continuously changing meshing engagement with the roller bushing 5. In the shown illustrative embodiment of FIG. 11 the driven internally geared gear 15 engages about the roller bushing 5 approximately up to the half of the axial length thereof. The driven internally geared gear 15 exhibits a circular shaped disk 16, which connects the circumscribing walls of the driven internally geared gear 15 with each other at the ends (final laterally). A driven shaft 13 is preferably formed unitarily with this disk 16.

The outer diameter of the two geared rings 5a, 5b of the roller bushing 5 preferably exhibit an identical outer diameter. This shown graphically in the perspective view in FIG. 4. The same outer diameter of the two geared rings 5a, 5b of the roller bushing 5 ensures therefor, that during a deformation of the roller bushing 5 the teeth do not get in each others way. Thereby an improved effectiveness of the gear is achieved. However, it is also possible that the outer diameter of the two geared rings 5a, 5b can be dissimilar.

In the illustrated embodiment according to FIG. 11 it is assumed, that the drive unit 30 includes an elliptically shaped drive core 41 connected rigidly with the drive shaft 11, on which a plurality of radially outwardly extending, preferably equally-long spokes or struts 40 are supported. The spokes 40 lie, on the end facing away from the drive core 41, on the inner wall of the roller bushing 5 or are unitarily connected therewith and press, during rotation of the drive shaft 11, the roller bushing 5 at two oppositely lying engagement positions or as the case may be circumference sections against the gearing or teeth of the support surface 3 or as the case may be the ring surface 17 of the driven internally geared gear 15. The manner of operation and the components of a reduction gear of this type is described in detail in the above mentioned DE 296 14 738 U1, to which reference is made for simplicity.

In the further construction of this known type of reduction gear the roller bushing 5 however exhibits on its outer jacket surface 7 not only a gearing which is evenly spaced over the entire axial length of the roller bushing 5, but rather two axially adjacent gear rings 5a, 5b with different numbers of gear teeth. The first gear ring 5a engages meshingly in one or more, actually two as in the case of the illustrated embodiment shown in FIG. 1, circumference sections in the support surface 3 of the support ring. The first gear ring 5a exhibits for this a tooth count Z3.

The second gear ring 5b in comparison meshes sectionally with one or with multiple circumference sections or segments, based upon the elliptical drive core 41, here with likewise two circumference sections, with the ring surface 17 of the driven internally geared gear 15. The second gear ring 5b of the roller bushing 5 exhibits the tooth count Z4.

As a result of the differing selection of the tooth count Z3 and Z4 very large reduction relationships of the gear unit can be achieved.

In order to ensure an optimal tooth engagement of the teeth Z1 and Z3 or as the case may be the teeth Z2 and Z4, the tooth count Z1 and Z3 are respectively a whole number multiple of the number which is maintained in engagement in the first circumference section, that is the number of the engagement positions already in engagement between first gear ring 5a and support surface 3 of support ring 1. The tooth counts Z2 and Z4 are respectively a whole number multiple of the second circumference sections maintained in engagement, that is that number of the engagement positions between the second gear ring 5b and the ring surface 17 of the driven internally geared gear 15.

Figure 1:
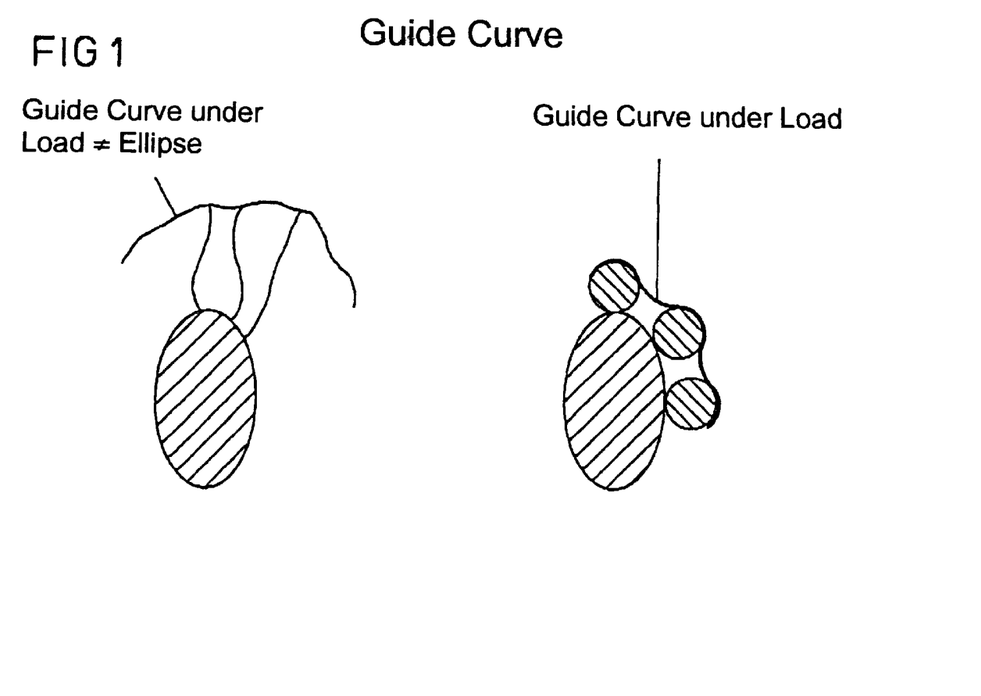
FIG. 1 shows an elliptically deformed internal gear of a corrugated gear.
Figure 2:
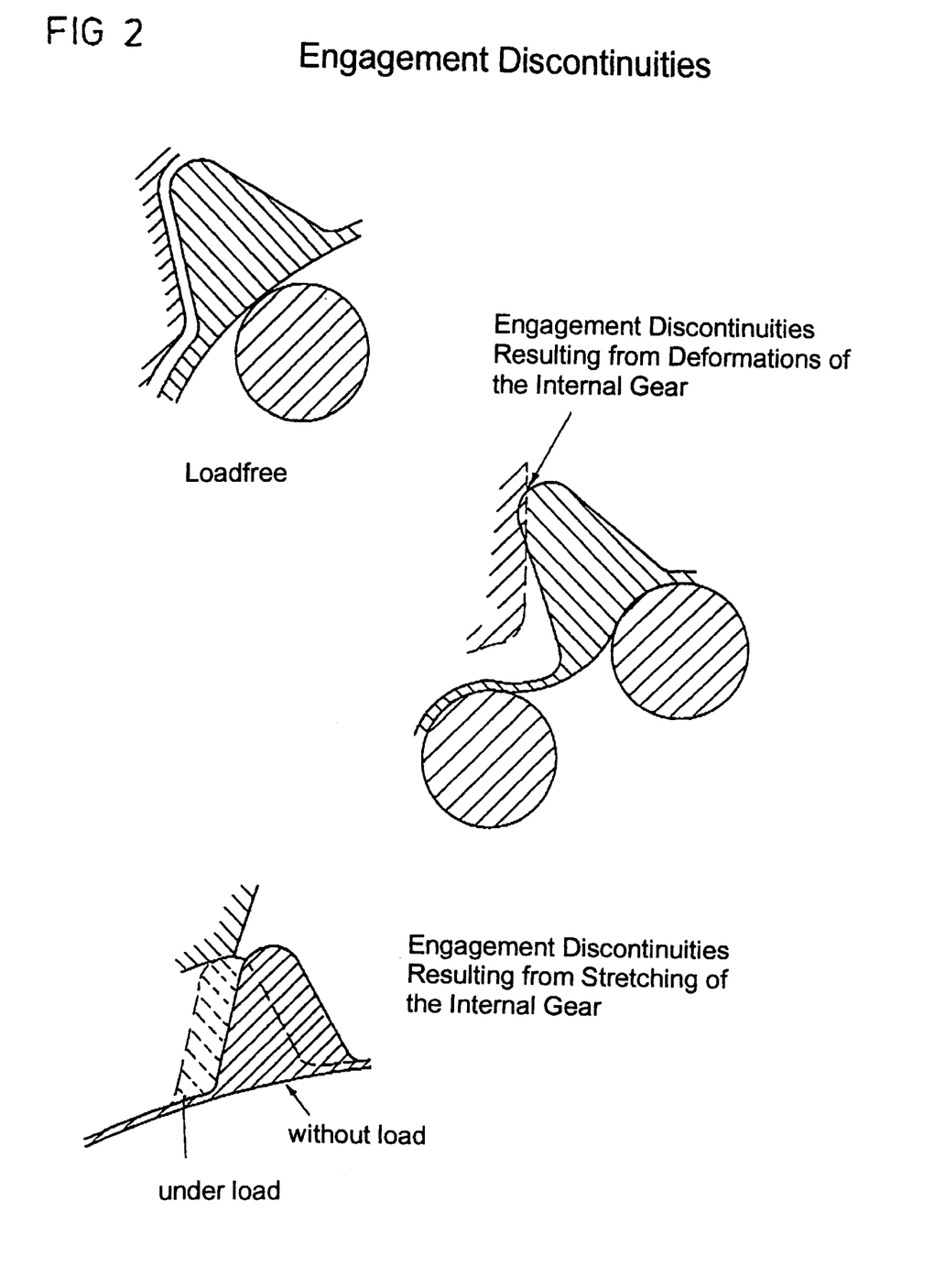
FIG. 2 shows engagement discontinuities or disruptions which can occur when deformations under load are not considered, or in the case of a too general model.

If the gear ring 5a of the roller bushing 5 meshes with the support surface 3 of the surface ring 1 at two positions and the second gear ring 5b of the roller bushing 5 with the ring surface of the driven internally geared gear 15 likewise at two engagement positions on the basis of the selected drive unit 30, as for example in the illustrative embodiment of FIG. 1, so then the tooth count Z1 and Z3 respectively are a whole number multiple of the number 2 and the tooth number Z2 and Z4 respectively a whole number multiple of the number 2.

As a result of the selected tooth differential Z1–Z3 a relative movement of the roller bushing 5 is produced. At the same time, as a result of the engagement of the second gear ring 5b of the roller bushing 5 with the inner teeth or gear 15, the driven shaft 13 is driven. The speed of the drive of the driven internally geared gear 15 and therewith the driven shaft 13 depends upon the tooth count difference Z2–Z4. As a result of the tooth count difference Z2–Z4 their results between the roller bushing 5 and the driven internally geared gear 15 a relative movement, wherein the movement of the driven internally geared gear 15 and therewith the driven shaft 13 works counter-rotating to the movement of the roller bushing in engagement with the support surface 3 of the support ring 1.

The essential advantage of providing two gear rings 5a, 5b with differing tooth counts Z3 and Z4 on the roller bushing is comprised therein that without adversely effecting the assembly's base and operational effectiveness a significantly larger translation or reduction is possible.

The tooth count differentials Z1–Z3 and Z2–Z4 are preferably selected to be as close as possible since thereby the same deformation is effective for both gear engagements. Although the roller bushing 5 is preferably unitary or one piece and preferably formed as a plastic injection molded part, the roller bushing 5 can be formed of two parts, which are subsequently joint fixed against rotation to each other.

The overall translation or reduction of such a reduction gear can be calculated as follows:

$$i = \frac{1}{1 - \frac{Z1 \cdot Z4}{Z3 \cdot Z2}}.$$

If the tooth count Z4 is smaller than Z3, then the drive shaft 11 and driven shaft 13 turn in the same direction. If, however, the tooth count Z4 of the second gear ring 5b is larger than the tooth count Z3 of the first gear ring 5b of the roller bushing 5, then the drive shaft 11 and the driven shaft 13 rotate in opposite directions.

A translational relationship of i=441 results for example in the case, when the tooth count Z1=100, Z2=90, Z3=98 and Z4=88 is selected. The translational relationship of I=−539 is produced in the case, when one selects Z1=100, Z2=110, Z3=98 and Z4=108.

As can be seen from this illustrative embodiment, the tooth counts Z1 and Z3 are respectively a whole number multiple of the number 2 and the tooth counts Z2 and Z4 likewise a whole number multiple of the number 2. This resulted because the present illustrative embodiment was based upon the factor that the first gear ring 5a meshes with the support surface 3 of the support ring 1 at two circumference segments and the second gear ring 5b meshes with the roller bushing likewise at two circumference segments on the ring surface 17 of the driven internally geared gear 15.

The two mathematical examples also show, that the tooth differences Z1–Z3 and Z2–Z4 are selected to be identical, since thereby the same deformation is advantageously effective for the meshing engagement of the gears.

Figure 13:
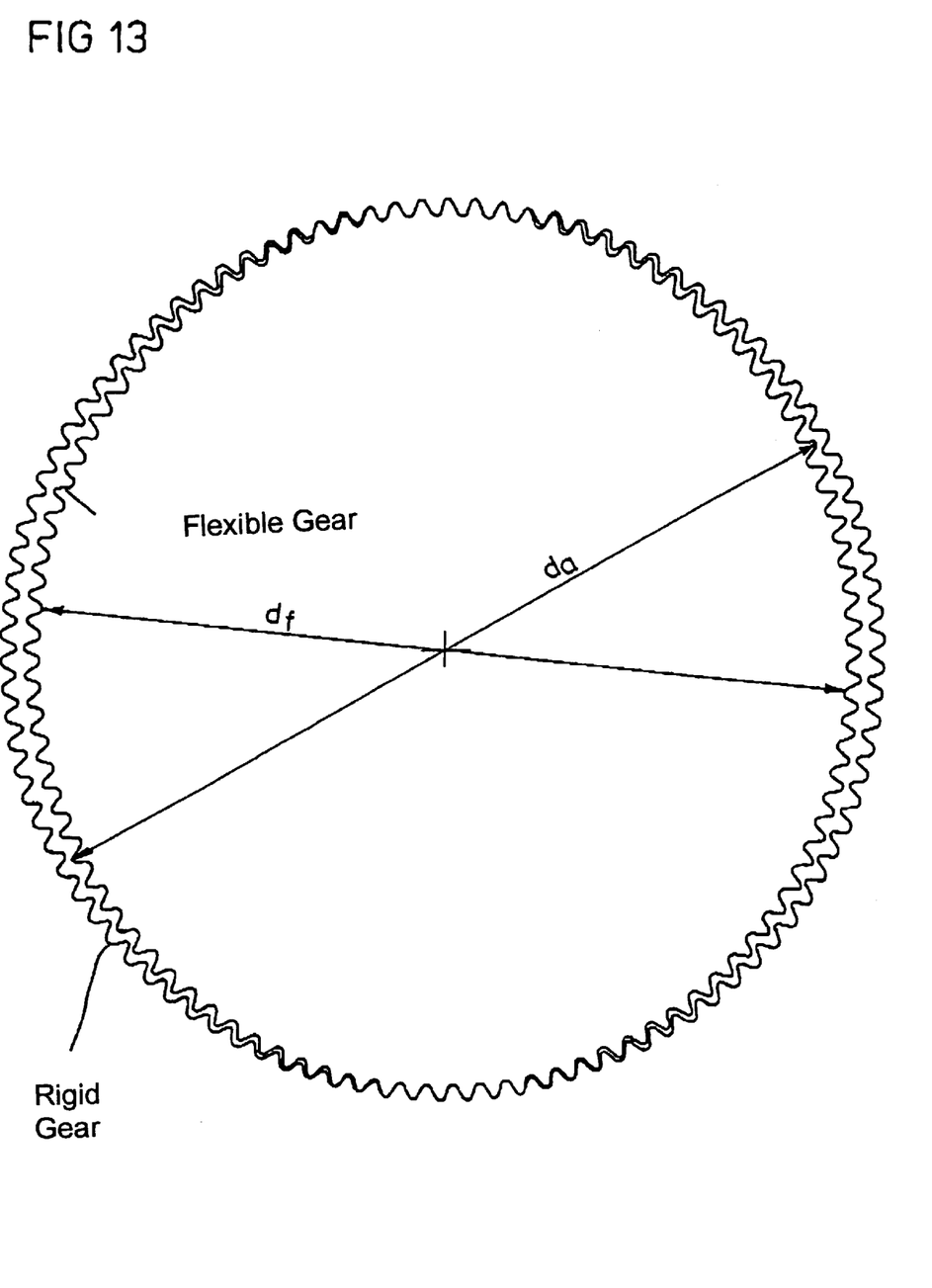
FIG. 13 shows, with reference characters Da and Df, the outer and foot diameter or cross section of the wave generator.
Figure 14:
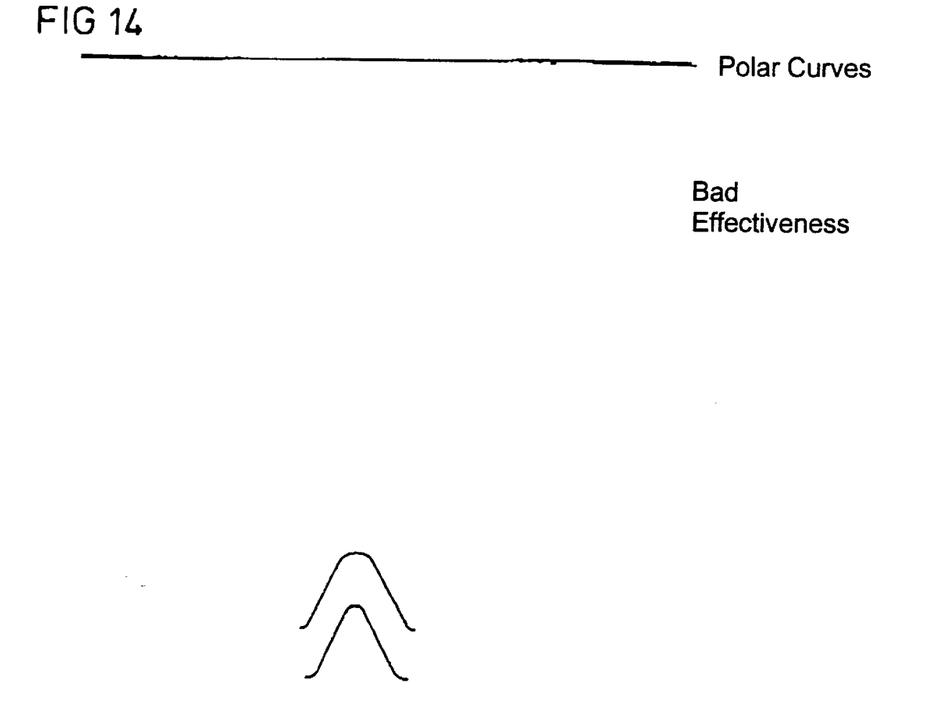
In FIG. 14 the polar curves are shown prior to an operational efficiency optimization and in FIG. 15 after an operational effectiveness optimization according to the present invention.
Figure 15:
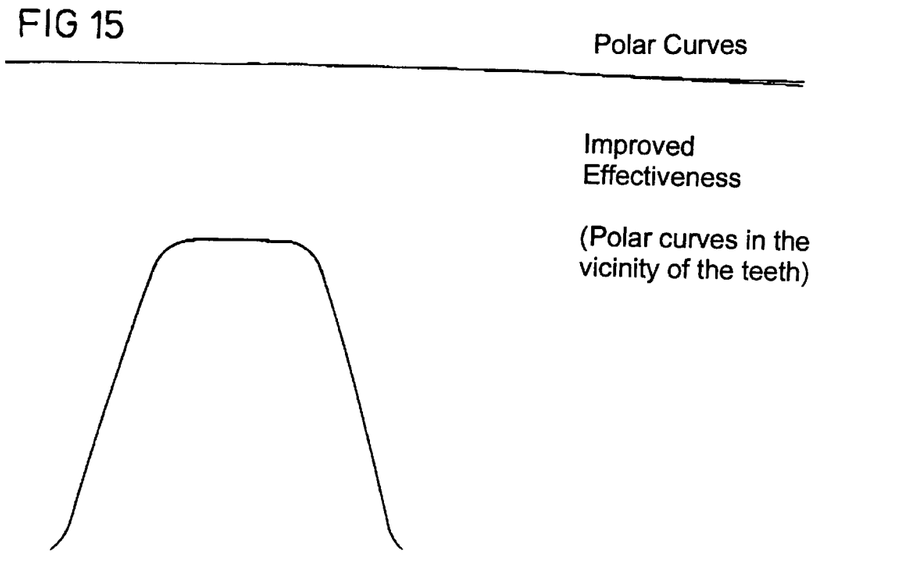
Figure 16:
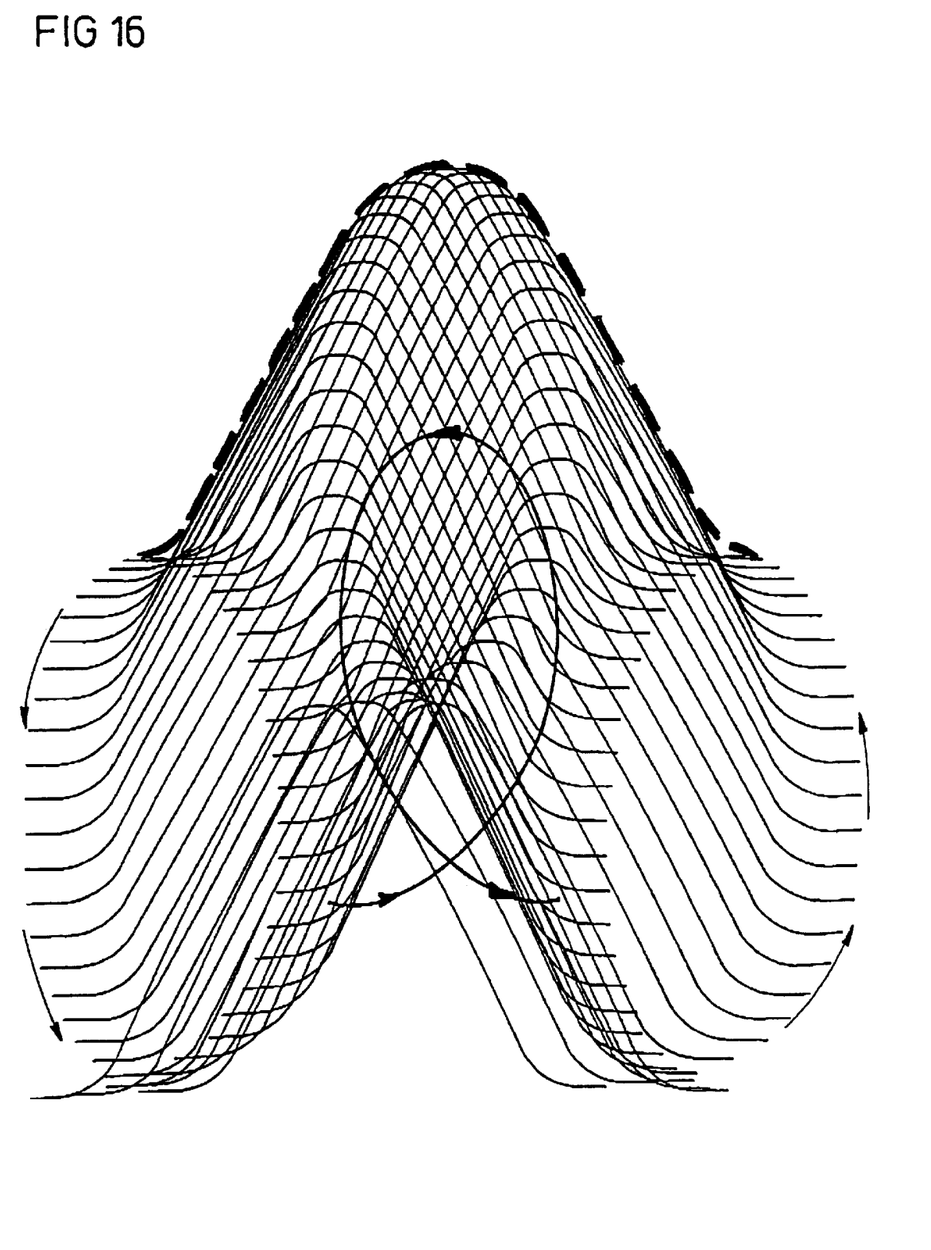
In FIG. 16 the path of a tooth on the wave generator is shown at various points in time.

The reference characters Da and Df in FIG. 13 represent the outer and foot diameter or cross section of the wave generator and are known as such. In FIG. 14 the polar curves are shown prior to an operational efficiency optimization and in FIG. 15 after an operational effectiveness optimization according to the present invention. As can be seen, after optimization of the working effectiveness, the polar curves lie in the vicinity of the teeth. In FIG. 16 the path of a tooth on the wave generator is shown at various points in time. One can clearly recognize the loopy "l"-shaped movement of the tooth. Therein notice is to be taken of the left and right of the contour, which are produced by the end points of the route or base. The thereby formed or resulting envelope, which is indicated in bold-dashed lines, precisely determines the contour of the tooth gap in the internally geared gear. It can be seen, that the dashed line exhibits no corners and runs curved throughout. As a result thereof the tooth requires more place in the tooth gap in the internally geared gear.

What is claimed is:

1. Corrugated gear including the following features:
   a) a rigid internally geared gearwheel;
   b) a flexible gear with external gearing provided within said internally geared gearwheel;
   c) a wave generator for bringing the gear with external teeth into such a cross-sectional shape, that the gear with external gearing is only partially meshing with the rigid gear with internally geared gearing and rotates the engaged segment of the two gears in the direction of the circumference;
   d) a relative movement of the two gears results from the rotation of the wave generator;
   e) the flexible gear and the rigid gear are both end-toothed gears;
   f) in order to avoid engagement obstructions the tooth profile of the rigid gear and the tooth profile of the flexible gear are adapted to each other;
   and wherein:
   g) the tooth profile of the flexible gear and the tooth profile of the rigid internal gear are chosen such that each tooth of the flexible gear can make a loop-shaped movement within a tooth gap of the tooth profile of the rigid internal gear, whereby
   h) the movement contour of a tooth of the flexible gear determines the contour of the tooth gap of the tooth profile of the rigid gear while making its loop-shaped movement.

2. Corrugated gear according to claim 1, wherein the polar curves of the flexible and rigid gear lie close to the area of the teeth of the flexible and rigid gear.

3. Corrugated gear according to claim 1, wherein the polar curves of the flexible and rigid gear lie in the area of the teeth of the flexible and rigid gear.

4. Corrugated gear according to claim 1, wherein a tooth gap in the tooth profile of the rigid gear is large enough that an entering tooth of the flexible gear can make a loop-shaped movement, that this flexible tooth first lies against the flank of the tooth gap which is facing the direction of rotation of the wave generator, and while making the loop-shaped movement, moves counter to the rotating direction of the wave generator, in order to lie against the flank of the tooth gap facing away from the direction of rotation of the wave generator.

5. Corrugated gear according to claim 1, wherein the direction of the loop-shaped movement of a tooth of the flexible gear is opposed to the rotating direction of the wave generator.

6. Corrugated gear according to claim 1, wherein at least the flexible gear is formed of plastic.

7. Corrugated gear according to claim 1, wherein the rigid gear is formed of plastic or metal.

8. Corrugated gear according to claim 1, wherein the tooth feet of the teeth of the rigid gear exhibit a contour, which is approximately patterned after the movement contour of a flexible gear tooth which comes in and makes a loop-shaped movement.

9. Corrugated gear according to claim 1, wherein the tooth profile of the rigid gear wheel is determined by the enveloping of the positions of the deformed, flexible gear wheel while rolling upon the rigid gear wheel.

10. Corrugated gear according to claim 1, wherein the plastic tooth profile of the flexible gear includes a mechanical reinforcement.

11. Corrugated gear according to claim 10, wherein the mechanical reinforcement is formed by coating or layering an outer surface with a material having a higher mechanical stability than the plastic of the flexible gear.

12. Corrugated gear according to claim 11, wherein a surface coating a metal or ceramic coating is selected.

13. Corrugated gear according to claim 10, wherein a metal ring is seated upon the flexible gear.

14. Corrugated gear according to claim 1, wherein measured at one-half the tooth height, each tooth gap in the rigid gear is approximately 1.5 to 2 times broader than a tooth of the flexible gear.

15. Corrugated gear according to claim 1, wherein the flexible gear can be brought into an elliptical cross-sectional shape via the wave generator.

16. Method for calculating the tooth profiles of the rigid and flexible gears in a corrugated gear according to claim 1, comprising:
   a) predetermining the gear unit data i, z1, z2, z3, z4, da1 df1, da2, df2;
   b) predetermining the contour and the stroke of the wave generator;
   c) iterative determination of the tooth contour of the flexible gear in such a manner, that its polar curve lies at least approximately in the area of the teeth of the flexible gear;
   d) predetermining a reference profile for the rigid gear according to the measurements of the tooth contour of the flexible gear as determined in step c);
   e) iterative, reciprocal modification of the profile of the rigid gear and the previously determined tooth contour of the flexible gear by means of an computer algorithm in order to arrive at an optimized tooth coverage or overlap,
   wherein
   i is the translational relationship of the drive,
   z1 is the tooth count of the flexible gear on the drive side, z2 is the tooth count of the rigid internally geared gear on the drive side, z3 is the tooth count of the flexible gear on the driven side, z4 is the tooth count of the output or driven side, da1 is the outer diameter of the wave generator (=roller bushing) on the drive side, df1 is the foot diameter of the wave generator (=roller bushing) on the driven side, da2 is the outer diameter of the wave generator (=roller bushing) on the output or driven side, df2 is the foot diameter of the wave generator (=roller bushing) on the driven or output side, and wherein the iterative determination of the tooth profile of the flexible gear is produced by a computer program, which provides for each tooth profile the corresponding polar curve graphically on a screen and the teething varies in such way that the polar curves are displaced so as to be close to or in the area of the teeth.

17. Method according to claim 16, wherein in step e) all tooth profiles and all tooth flanks including their tooth feet, their active flanks and their head flanks are computed with their counter- or opposing-flanks.

18. Method according to claim 16, wherein the calculation of the tooth profiles is based on a load bearing guide curve of the flexible gear.

19. Method according to claim 18, wherein the guide curve is unequal to an ideal ellipse.

* * * * *